3,060,178
DERIVATIVES OF BENZOTHIADIAZINE-1,1-DIOXIDE
Carl Ziegler, Glenside, Pa., assignor to Merck & Co., Inc., Rahway, N.J., a corporation of New Jersey
No Drawing. Filed Jan. 4, 1960, Ser. No. 24
10 Claims. (Cl. 260—243)

This invention comprises novel benzothiadiazine-1,1-dioxide compounds containing as a substituent attached to the 7-position carbon atom an alkoxymethylenesulfamyl or an aminomethylenesulfamyl group and in addition at least one other substituent attached to the 6-position carbon of the benzothiadiazine nucleus. The benzothiadiazine-1,1-dioxide can be either the unsaturated compound, that is the 1,2,4-benzothiadiazine-1,1-dioxide, or it can be the saturated compound, that is the 3,4-dihydro-1,2,4-benzothiadiazine-1,1-dioxide. The invention also embraces novel methods for preparing these compounds.

The novel compounds of this invention can be considered to have one of the general structures:

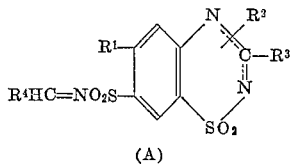

(A)

and

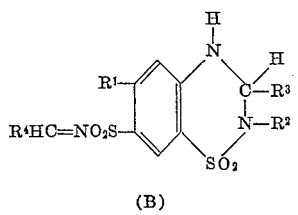

(B)

wherein $R^1$ is selected from halogen or a halogen-like radical such as, for example, chlorine, bromine, fluorine, trihalomethyl as trifluoromethyl, trichloromethyl and the like; a lower alkyl having for example from 1 to 5 carbon atoms, a lower alkoxy also having from 1 to 5 carbon atoms, or a nitro group; $R^2$ represents hydrogen or a lower alkyl radical preferably having from 1 to 5 carbon atoms and, in structure A, the radical $R^2$ is attached to either the nitrogen in the 2-position or the nitrogen in the 4-position; $R^3$ is selected from hydrogen, a lower alkyl having for example from 1 to 12 carbon atoms, an aryl radical preferably phenyl, or an aralkyl radical preferably benzyl; and $R^4$ is either a lower alkoxy radical having up to about three carbon atoms, the amino or a mono- or di-lower-alkylamino radical, the alkyl groups in the secondary- or tertiary-amino radical preferably being the methyl and/or ethyl groups.

The novel compounds of this invention are useful principally because of their diuretic, natriuretic and saluretic properties. The compounds are of particular interest because they are long acting, and thus effect their diuretic activity over a much longer period of time than other diuretics of the benzothiadiazine-1,1-dioxide family. The compounds are effective upon oral administration in the form of tablets or capsules or the like. The pharmacotherapeutic properties of these compounds make them particularly useful in the treatment of congestive heart failure and other abnormalities which produce an edematous condition in the body or which produce an imbalance in the electrolyte concentration in the body, for example, those in which retention of sodium occurs. The compounds having one or another of the above structural formulas wherein $R^1$ is a halogen and especially those halogen substituted compounds wherein $R^2$ and $R^3$ represent hydrogen are of particular interest as long-acting diuretric agents.

The novel compounds of this invention are readily prepared either by heating the selected 7-sulfamyl-1,2,4-benzothiadiazine-1,1-dioxide or the 3,4-dihydro compound with an orthoformate ester, preferably with moderate heating or, (2) by reacting the desired 2,4-disulfamyl-aniline with an orthoformate ester preferably with moderate heating over a prolonged period of time. Each of these procedures will yield the novel compounds illustrated by structures A and B above when $R^4$ is an alkoxy group.

Any of the orthoformate esters can be employed in preparing the 7-alkoxymethylenesulfamyl compounds of this invention, but preferably ethyl orthoformate and methyl orthoformate yield compounds of particularly outstanding utility.

The starting materials, i.e. the 2,4-disulfamylaniline or 7-sulfamyl-1,2,4-benzothiadiazine-1,1-dioxide compounds, are prepared by the methods described in U.S. Patents 2,809,194 and 2,910,473 or by the methods described by Parke et al. in the 1950 issue of Journal of the Chemical Society, page 1760, or by the method of Freeman et al. described in Journal of Organic Chemistry, volume 16, page 815 (1951), or by the methods described in one or more of the papers referred to in the bibliography of either one of these journal references.

The compounds illustrated by the above structures wherein $R^4$ is an amino group advantageously are prepared from the 7-alkoxymethylenesulfamyl compounds upon treating said compound with an excess of ammonia or the selected mono-alkyl- or di-alkyl-amine. The reaction proceeds readily at room temperature to form the desired 7-aminomethylenesulfamyl-1,2,4-benzothiadiazine-1,1-dioxide or the corresponding 3,4-dihydro compound.

Ammonia or any mono-alkyl- or di-alkylamine can be used to convert the 7-alkoxymethylenesulfamyl compounds to the desired 7-aminomethylenesulfamyl compounds, although it is preferred when the reaction is carried out with a primary- or secondary-amine to employ the lower-alkyl amines such as amines substituted with methyl and/or ethyl groups.

The preparation of the novel compounds of this invention is more fully described in the following examples. It is to be understood, however, that the examples are illustrative of the compounds embraced by this invention and the methods for their preparation, and are not to be construed as limiting the invention to the particular compounds or methods specifically described.

EXAMPLE 1

*6-Chloro-7-Ethoxymethylenesulfamyl-1,2,4-Benzothiadiazine-1,1-Dioxide*

A suspension of 15 g. of 6-chloro-7-sulfamyl-1,2,4-benzothiadiazine-1,1-dioxide in 100 ml. of ethyl orthoformate is heated under reflux with good stirring for 24 hours. The reaction mixture then is cooled and the solid material is separated therefrom by filtration yielding 15.4 g. of 6-chloro-7-ethoxymethylenesulfamyl-1,2,4-benzothiadiazine-1,1-dioxide, M.P. 195° C., resolidifying and remelting at 207–210 C. When recrystallized from acetonitrile and ether, the product melts at 195–196° C. resolidifying and remelting at 208–210° C.

*Analysis.*—Calculated for $C_{10}H_{10}ClN_3O_5S_2$: C, 34.14; H, 2.87; N, 11.94; $C_2H_5O$, 12.81. Found: C, 34.35; H, 2.95; N, 11.96; $C_2H_5O$, 12.70.

EXAMPLE 2

*6-Chloro-7-Ethoxymethylenesulfamyl-1,2,4-Benzothiadiazine-1,1-Dioxide*

By replacing the 6-chloro-7-sulfamyl-1,2,4-benzothiadiazine-1,1-dioxide employed in Example 1 by an equimolecular quantity of 2,4-disulfamyl-5-chloroaniline and following substantially the same procedure described in Example 1, there is obtained 6-chloro-7-ethoxymethylenesulfamyl-1,2,4-benzothiadiazine - 1,1 - dioxide, having the same melting point and analysis obtained for the product of Example 1.

EXAMPLE 3

*6-Chloro-7-Aminomethylenesulfamyl-1,2,4-Benzothiadiazine-1,1-Dioxide*

Anhydrous ammonia is bubbled through a suspension of 6.5 g. of 6-chloro-7-ethoxymethylenesulfamyl-1,2,4-benzothiadiazine-1,1-dioxide (obtained as described in either Examples 1 or 2 above) in 50 ml. of anhydrous ethanol. Complete solution occurs in a few minutes after which the product begins to crystallize. After 15 minutes, the suspension is cooled and filtered yielding 3.5 g. of 6-chloro-7-aminomethylenesulfamyl-1,2,4-benzothiadiazine-1,1-dioxide, M.P. 308–310° C. with effervescence. Recrystallization from alcohol raises the melting point to 309–311° C. with effervescence.

*Analysis.*—Calculated for $C_8H_7ClN_4O_4S_2$: C, 29.77; H, 2.19; N, 17.36. Found: C, 29.89; H, 2.52; N, 17.04.

EXAMPLE 4

*6-Bromo-7-Propoxymethylenesulfamyl-1,2,4-Benzothiadiazine-1,1-Dioxide*

By replacing the benzothiadiazine and the orthoformate ester employed in Example 1 by equivalent quantities of 6-bromo - 7 - sulfamyl-1,2,4-benzothiadiazine-1,1-dioxide and propyl orthoformate, and following substantially the same procedure described in Example 1, there is obtained 6 - bromo-7-propoxymethylenesulfamyl-1,2,4-benzothiadiazine-1,1-dioxide.

EXAMPLE 5

*6-Methoxy-7-Ethoxymethylenesulfamyl-1,2,4-Benzothiadiazine-1,1-Dioxide*

By replacing the benzothiadiazine employed in Example 1 by an equivalent quantity of 6-methoxy-7-sulfamyl-1,2,4-benzothiadiazine-1,1-dioxide and following substantially the same procedure as described in Example 1, there is obtained 6-methoxy-7-ethoxymethylenesulfamyl-1,2,4-benzothiadiazine-1,1-dioxide.

EXAMPLE 6

*6-Methoxy-7-(N,N-Dimethylaminomethylenesulfamyl)-1,2,4-Benzothiadiazine-1,1-Dioxide*

By following substantially the same procedure described in Example 3 but using 6-methoxy-7-ethoxymethylenesulfamyl-1,2,4-benzothiadiazine-1,1-dioxide (i.e. the product of Example 5) and about a 3 molar excess of dimethylamine and carrying out the reaction in anhydrous alcohol there is obtained 6-methoxy-7-(N,N-dimethylaminomethylenesulfamyl) - 1, 2, 4 - benzothiadiazine-1,1-dioxide.

EXAMPLE 7

*3-Propyl-6-Chloro-7-Ethoxymethylenesulfamyl-1,2,4-Benzothiadiazine-1,1-Dioxide*

By replacing the benzothiadiazine employed in Example 1 by an equivalent quantity of 3-propyl-6-chloro-7-sulfamyl-1,2,4-benzothiadiazine-1,1-dioxide, and following substantially the same procedure described in Example 1 there is obtained 3-propyl-6-chloro-7-ethoxymethylenesulfamyl-1,2,4-benzothiadiazine-1,1-dioxide.

EXAMPLE 8

*3-Benzyl-6-Fluoro-7-Ethoxymethylenesulfamyl-1,2,4-Benzothiadiazine-1,1-Dioxide*

By replacing the benzothiadiazine employed in Example 1 by an equivalent quantity of 3-benzyl-6-fluoro-7-sulfamyl-1,2,4-benzothiadiazine-1,1-dioxide and following substantially the same procedure described in Example 1, there is obtained 3-benzyl-6-fluoro-7-ethoxymethylenesulfamyl-1,2,4-benzothiadiazine-1,1-dioxide.

EXAMPLE 9

*3-Phenyl-6-Chloro-7-Ethoxymethylenesulfamyl-1,2,4-Benzothiadiazine-1,1-Dioxide*

By replacing the benzothiadiazine employed in Example 1 by an equivalent quantity of 3-phenyl-6-chloro-7-sulfamyl-1,2,4-benzothiadiazine-1,1-dioxide, and following substantially the same procedure described in Example 1 there is obtained 3-phenyl-6-chloro-7-ethoxymethylenesulfamyl-1,2,4-benzothiadiazine-1,1-dioxide.

EXAMPLE 10

*6-Methyl-7-Ethoxymethylenesulfamyl 1,2,4-Benzothiadiazine-1,1-Dioxide*

By replacing the benzothiadiazine employed in Example 1 by an equivalent quantity of 6-methyl-7-sulfamyl-1,2,4-benzothiadiazine-1,1,-dioxide, and following substantially the same procedure described in Example 1, there is obtained 6-methyl-7-ethoxymethylenesulfamyl-1,2,4-benzothiadiazine-1,1-dioxide.

EXAMPLE 11

*6-Nitro-7-Ethoxymethylenesulfamyl-1,2,4-Benzothiadiazine-1,1-Dioxide*

By replacing the benzothiadiazine employed in Example 1 by an equivalent quantity of 6-nitro-7-sulfamyl-1,2,4-benzothiadiazine-1,1-dioxide and following substantially the same procedure described in Example 1, there is obtained 6 - nitro - 7 - ethoxymethylenesulfamyl-1,2,4-benzothiadiazine-1,1-dioxide.

EXAMPLE 12

*6-Nitro-7-(N-Ethylaminomethylenesulfamyl)-1,2,4-Benzothiadiazine-1,1-Dioxide*

By following substantially the same procedure described in Example 3 and substituting 6-nitro-7-ethoxymethylenesulfamyl - 1,2,4 - benzothiadiazine-1,1-dioxide (obtained as described in Example 11) and ethylamine in anhydrous alcohol for the reactants employed in Example 3, there is obtained 6-nitro-7-(N-ethylaminomethylenesulfamyl)-1,2,4-benzothiadiazine-1,1-dioxide.

EXAMPLE 13

*6-Trifluoromethyl-7-Ethoxymethylenesulfanyl-1,2,4-Benzothiadiazine-1,1-Dioxide*

*Step A.*—2 - amino - 4 - trifluoromethylbenzenesulfonic acid (32 g., 0.132 mole) is added portionwise with stirring to 100 ml. of chlorosulfonic acid, cooled in an ice-bath over a 10 minute period. The solution then is heated in an oil bath at 150° C. for three hours and thereafter cooled to 20° C. Thionyl chloride (40 ml.) is added and the mixture heated on the steam bath for one hour, then cooled to 0° C. and poured cautiously onto ice. The aqueous liquor is decanted and the residual solid heated on the steam bath with 500 ml. of 28% ammonium hydroxide for two hours. Upon cooling, the product is collected on the filter, washed with water and dried. To remove a trace amount of 2-sulfamyl-5-trifluoromethylaniline that is obtained along with the product, the material remaining on the filter is digested with 500 ml. of boiling benzene, filtered, and the benzene-soluble material recrystallized from aqueous alcohol yielding 2,4-disulfamyl-5-trifluoromethylaniline as colorless needles, M.P. 241–242° C.

Step B.—By replacing the 2,4-disulfamyl-5-chloroaniline employed in Example 2 by the 2,4-disulfamyl-5-trifluoromethylaniline obtained as described in step A above and following substantially the same procedure described in Example 2, there is obtained 6-trifluoromethyl-7-ethoxy-methylenesulfamyl - 1,2,4 - benzothiadiazine-1,1-dioxide.

EXAMPLE 14

*2-Methyl-6-Chloro-7-Ethoxymethylenesulfamyl-1,2,4-Benzothiadiazine-1,1-Dioxide*

Step A.—One hundred grams of 5-chloroaniline-2,4-disulfonyl chloride is added to 200 ml. of 40% aqueous methylamine in portions with cooling. The solution is heated on the steam bath for one hour, cooled, and the product which crystallizes is separated by filtration. The crude product is dissolved in dilute (5%) sodium hydroxide and reprecipitated with the dilute hydrochloric acid yielding 84.5 g. of 2,4-bis(methylsulfamyl)-5-chloroaniline, M.P. 176–178° C.

Step B.—One hundred grams of 2,4-bis(methylsulfamyl)-5-chloroaniline and 200 ml. of ethyl orthoformate are heated in an open flask at 130–135° C. for 1½ hours. After cooling, the product which precipitates is separated by filtration, yielding 98.2 g. of 2-methyl-6-chloro-7-methylsulfamyl- -1,2,4-benzothiadiazine-1,1-dioxide, M.P. 217–219° C. Purification is accomplished by dissolving the product in 200 ml. of hot dimethylformamide, diluting with 500 ml. of alcohol and cooling, whereupon 80.6 g. of product is obtained, M.P. 221–223° C.

Step C.—A solution of 68.3 g. of the thus obtained 2-methyl-6-chloro-7 - methylsulfamyl - 1,2,4 - benzothiadiazine-1,1-dioxide in 150 ml. of chlorosulfonic acid is heated for 5 hours on the steam bath (95° C.). The solution then is cooled and poured onto crushed ice thereby forming a precipitate which is removed by filtration and air dried. After recrystallization from a mixture of acetone-hexane there is obtained 43.2 g. of 2-methylsulfamyl-5-chloroaniline-4-sulfonyl chloride, M.P. 159–162° C.

*Analysis.*—Calculated for $C_7H_8Cl_2N_2O_4S_2$: C, 26.34; H, 2.53; N, 8.78. Found: C, 26.99; H, 2.64; N, 8.72.

Step D.—The sulfonyl chloride obtained as described in step C is added to 250 ml. of 28% ammonium hydroxide and the solution heated on the steam bath for one hour. After cooling there is obtained 25.3 g. of 2-methylsulfamyl-4-sulfamyl-5-chloroaniline, M.P. 185–188° C. Recrystallization from water raises the melting point to 189–191° C. An isomorphic form exists that melts at 168–170° C.

*Analysis.*—Calculated for $C_7H_{10}ClN_3O_4S_2$: C, 28.05; H, 3.36; N, 14.02. Found: C, 28.19; H, 3.41; N, 13.95.

Step E.—A suspension of 7.5 g. of the 2-methylsulfamyl-4-sulfamyl-5-chloroaniline in 50 ml. of ethyl orthoformate is heated under reflux for 9 hours. The crystalline precipitate which forms is removed by filtration, washed with a little alcohol to yield (7.2 g.) of 2-methyl-6-chloro-7-ethoxymethylenesulfamyl-1,2,4-benzothiadiazine-1,1-dioxide, M.P. 156–158° C.

*Analysis.*—Calculated for $C_{11}H_{12}ClN_3O_5S_2$: C, 36.11; H, 3.31; N, 11.49; $C_2H_5O$, 12.32. Found: C, 35.48; H, 3.68; N, 11.35; $C_2H_5O$, 12.94.

Substitution of 2-methyl-6-chloro- 7 - sulfamyl - 1,2,4-benzothiadiazine-1,1-dioxide for the 2-methylsulfamyl-4-sulfamyl-5-chloroaniline employed in step E in Example 14 gives the identical product, 2-methyl-6-chloro-7-ethoxymethylenesulfamyl-1,2,4-benzothiadiazine-1,1-dioxide.

EXAMPLE 15

*2-Methyl-6-Chloro-7-Aminomethylenesulfamyl-1,2,4-Benzothiadiazine-1,1-Dioxide*

When anhydrous ammonia is passed into a solution of 2-methyl - 6 - chloro - 7 - ethoxymethylenesulfamyl-1,2,4-benzothiadiazine-1,1-dioxide in absolute alcohol in the manner described in Example 3, there is obtained 2-methyl-6-chloro-7-aminomethylenesulfamyl - 1,2,4-benzothiadiazine-1,1-dioxide, M.P. 230–232° C. after recrystallization from alcohol.

*Analysis.*—Calculated for $C_9H_9ClN_4O_4S_2$: C, 32.10; H, 2.69; N, 16.64. Found: C, 32.31; H, 2.76; N, 16.52.

EXAMPLE 16

*6-Chloro-7-Ethoxymethylenesulfamyl-3,4-Dihydro-1,2,4-Benzothiadiazine-1,1-Dioxide*

Step A.—A solution of 5.7 g. (0.02 mole) of 5-chloro-2,4-disulfamylaniline in 50 ml. of 90% ethanol containing 300 mg. of sodium hydroxide is heated on the steam bath with 2 g. of 37% formaldehyde solution (equivalent to 0.025 mole of formaldehyde), for 1.5 hours. The solution is acidified to litmus with 6 N hydrochloric acid. The solvent is removed by distillation until solid begins to separate. After cooling in an ice bath, the solid is collected on the filter, washed with water and recrystalized from aqueous ethanol to give 6-chloro-7-sulfamyl-3,4-dihydro-1,2,4-benzothiadiazine-1,1-dioxide as colorless needles, M.P. 262–263° C.

Step B.—A suspension of 6-chloro-7-sulfamyl-3,4-dihydro-1,2,4 - benzothiadiazine - 1,1 - dioxide obtained as described above in ethyl orthoformate (6 g. in 50 ml.) is heated under reflux for 20 hours, then cooled yielding 6.5 g. of 6-chloro-7-ethoxymethylenesulfamyl - 3,4 - dihydro-1,2,4 - benzothiadiazine - 1,1 - dioxide, M.P. 228–230° C. with effervescence. Recrystallization from acetonitrile raises the melting point to 230–231° C. with effervesence.

*Analysis.*—Calculated for $C_{10}H_{12}ClN_3O_5S_2$: C, 34.94; H, 3.42; N, 11.88. Found: C, 34.67; H, 3.60; N, 11.82.

EXAMPLE 17

*6-Trifluoromethyl-7-Ethoxymethylenesulfamyl-3,4-Dihydro-1,2,4-Benzothiadiazine-1,1-Dioxide*

Step A.—A solution of 3.2 g. (0.01 mole) of 2,4-disulfamyl-5-trifluoromethylaniline and 0.6 g. (0.02 mole) of paraformaldehyde in a mixture of 30 ml. of ethanol and 30 ml. 6 N hydrochloric acid is heated on the steam bath for 30 minutes in an open flask to permit the gradual evaporation of ethanol. The solution then is cooled and the crystalline precipitate collected on the filter, washed with water and recrystallized from aqueous ethanol yielding 6-trifluoromethyl-7-sulfamyl-3,4 - dihydro - 1,2,4 - benzothiadiazine-1,1-dioxide as colorless prisms, M.P. 263–264° C.

Step B.—By replacing the dihydro-benzothiadiazine employed in Example 16 by an equivalent quantity of 6-trifluoromethyl-7-sulfamyl-3,4-dihydro - 1,2,4 - benzothiadiazine-1,1-dioxide obtained as described above, and following substantially the same procedure described in Example 16, step B, there is obtained 6-trifluoromethyl-7-ethoxymethylenesulfamyl-3,4-dihydro-1,2,4 - benzothiadiazine-1,1-dioxide.

EXAMPLE 18

*6-Trifluoromethyl-7-Aminomethylenesulfamyl-3,4-Dihydro-1,2,4-Benzothiadiazine-1,1-Dioxide*

By replacing the benzothiadiazine employed in Example 3 by an equivalent quantity of 6-trifluoromethyl-7-ethoxymethylenesulfamyl-3,4-dihydro - 1,2,4 - benzothiadiazine-1,1-dioxide, prepared as described in Example 17, and following substantially the same procedure described in Example 3, there is obtained 6-trifluoromethyl-7-aminomethylenesulfamyl-3,4-dihydro - 1,2,4 - benzothiadiazine-1,1-dioxide.

The dosage of the novel compounds of this invention will vary over a wide range and for this reason tablets, pills, capsules, syrup, elixirs, injectable solutions, and the like containing per unit dosage, from about 25 mg. to about 300 mg. or more of the active ingredient can be made available to the physician for the symptomatic adjustment of the dosage to the individual patient. As these compounds can be put up in suitable dosage forms by methods known to pharmacists, the following example illustrates only one of many methods by which these compounds can be compounded.

EXAMPLE 19

[Compressed tablet comprising 50 mg. of active ingredient]

|  | Per tablet, mg. |
|---|---|
| 6-chloro-7-ethoxymethylenesulfamyl - 1,2,4 - benzothiadiazine-1,1-dioxide | 50.0 |
| Starch, U.S.P. | 20.2 |
| Lactose | 26.5 |
| Magnesium stearate | .05 |
|  | 97.2 |

The 6-chloro-7-ethoxymethylenesulfamyl-1,2,4 - benzothiadiazine-1,1-dioxide, part of the starch and the lactose are mixed together and granulated with a sufficient quantity of starch paste, prepared from the balance of the starch. The granulation (14 mesh) is dried at 45° C. for 20 hours and then rescreened (16 mesh).

The magnesium stearate is screened through a No. 90 bolting cloth onto the granulation and blended. The granulation is compressed into tablets of appropriate size on a machine using flatfaced, bevel-edged punches with a score.

While the above examples describe the preparation of certain compounds which are illustrative of the novel compounds of this invention, and a certain specific dosage form suitable for administering the novel compounds in therapy, and certain methods for preparing the compounds, it is to be understood that the invention is not to be limited by the examples or by the specific reaction conditions described for the preparation of the compounds or by the specific ingredients included in the pharmaceutical preparation, but is understood to embrace variations and modifications falling within the scope of the appended claims.

What is claimed is:

1. Benzothiadiazine selected from the group consisting of a compound having the structural formula

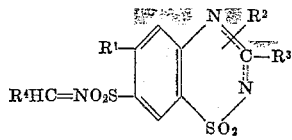

and

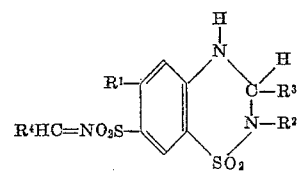

wherein $R^1$ is selected from the group consisting of halogen, lower alkyl, lower alkoxy and nitro; $R^2$ is selected from the group consisting of hydrogen and lower alkyl; $R^3$ is selected from the group consisting of hydrogen, lower alkyl, phenyl and benzyl; and $R^4$ is selected from the group consisting of lower alkoxy, amino, mono-lower-alkylamino, and di-lower-alkylamino.

2. 6 - halo - 7 - lower-alkoxymethylenesulfamyl - 1,2,4-benzothiadiazine-1,1-dioxide.

3. 6 - halo - 7 - lower-alkoxymethylenesulfamyl-3,4-dihydro-1,2,4-benzothiadiazine-1,1-dioxide.

4. 6 - halo-7-aminomethylenesulfamyl-1,2,4-benzothiadiazine-1,1-dioxide.

5. 6-halo - 7 - aminomethylenesulfamyl - 3,4 - dihydro-1,2,4-benzothiadiazine-1,1-dioxide.

6. 6 - chloro - 7 - ethoxymethylenesulfamyl-1,2,-4-benzothiadiazine-1,1-dioxide.

7. 6 - chloro - 7 - ethoxymethylenesulfamly - 3,4-dihydro-1,2,4-benzothiadiazine-1,1-dioxide.

8. 6 - trifluoromethyl-7-ethoxymethylenesulfamyl-1,2,4-benzothiadiazine-1,1-dioxide.

9. 6 - trifluoromethyl - 7 - ethoxymethylenesulfamyl-3,4-dihydro-1,2,4-benzothiadiazine-1,1-dioxide.

10. 6 - nitro - 7 - lower-alkoxymethylenesulfamyl-3,4-dihydro-1,2,4-benzothiadiazine-1,1-dioxide.

References Cited in the file of this patent

UNITED STATES PATENTS 2,910,475    Novello ------------- Oct. 27, 1959

OTHER REFERENCES

De Stevens et al.: Experientia, vol. 14, p. 463 (1958).